United States Patent
DeMolina et al.

(10) Patent No.: US 6,352,145 B1
(45) Date of Patent: Mar. 5, 2002

(54) STROKE DEPENDENT DAMPING

(75) Inventors: Simon Anne DeMolina, Brussegem (BE); Karl C. Kazmirski, Toledo, OH (US)

(73) Assignee: Tenneco Automotive Inc., Lake Forest, IL (US)

( * ) Notice: Subject to any disclaimer, the term of this patent is extended or adjusted under 35 U.S.C. 154(b) by 0 days.

(21) Appl. No.: 09/168,034

(22) Filed: Oct. 7, 1998

(51) Int. Cl.⁷ .................................................. F16F 9/50
(52) U.S. Cl. ................ 188/281; 188/282.1; 188/322.15
(58) Field of Search ............................. 188/282.1, 281, 188/282.5, 282.6, 284, 317, 322.15, 322.22, 280

(56) References Cited

U.S. PATENT DOCUMENTS

| | | |
|---|---|---|
| 4,474,271 A | 10/1984 | Molders et al. |
| 4,588,053 A * | 5/1986 | Foster .................. 188/275 |
| 4,809,829 A | 3/1989 | Hummel et al. |
| 4,874,066 A | 10/1989 | Silberstein |
| 4,905,799 A | 3/1990 | Yamaoka et al. |
| 4,964,493 A | 10/1990 | Yamaura et al. |
| 4,997,068 A | 3/1991 | Ashiba |
| 5,058,715 A | 10/1991 | Silberstein |
| 5,129,488 A | 7/1992 | Furuya et al. |
| 5,219,430 A | 6/1993 | Antonie |
| 5,226,512 A | 7/1993 | Kanari |
| 5,248,014 A | 9/1993 | Ashiba |
| 5,249,652 A | 10/1993 | Leitzman et al. ........ 188/282.1 |
| 5,277,283 A | 1/1994 | Yamaoka et al. |
| 5,368,142 A | 11/1994 | Ashiba et al. |
| 5,386,892 A | 2/1995 | Ashiba |
| 5,398,786 A | 3/1995 | Mintgen |
| 5,497,862 A | 3/1996 | Hoya |
| 5,503,258 A | 4/1996 | Clarke et al. |
| 5,518,090 A | 5/1996 | Miller et al. |

* cited by examiner

*Primary Examiner*—Pam Rodriguez
(74) *Attorney, Agent, or Firm*—Harness, Dickey & Pierce, PLC (57) ABSTRACT

A two-stage shock absorber has a pressure tube within which a valve assembly is slidably disposed. A piston rod is attached to the valve assembly and extends out of the pressure tube. A ring is slidably disposed within the pressure tube and engages the valve assembly. After a specified amount of movement of the valve assembly with respect to the pressure tube in an extension movement of the shock absorber, the sleeve engages a metered slot and reduces the fluid flow through the valve assembly to progressively switch the shock absorber from soft damping to firm damping.

24 Claims, 5 Drawing Sheets

STROKE DEPENDENT DAMPING

FIELD OF THE INVENTION

The present invention relates to a hydraulic damper or shock absorber adapted for use in a suspension system such as the systems used for automotive vehicles. More particularly, the present invention relates to a hydraulic damper having a two-stage damping characteristic where a relatively low level damping is provided for small amplitudes of movement and a relatively high level of damping is provided for large amplitudes of movement.

BACKGROUND OF THE INVENTION

A conventional prior art hydraulic damper or shock absorber comprises a cylinder defining a working chamber having a piston slidably disposed in the working chamber with the piston separating the interior of the cylinder into an upper and a lower working chamber. A piston rod is connected to the piston and extends out of one end of the cylinder. A first valving system is incorporated for generating damping force during the extension stroke of the hydraulic damper and a second valving system is incorporated for generating damping force during the compression stroke of the hydraulic damper.

Various types of damping force generating devices have been developed to generate desired damping forces in relation to the speed and/or the displacement of the piston within the cylinder. These multi-force damping force generating devices have been developed to provide a relatively small or low damping force during the normal running of the vehicle and a relatively large or high damping force during maneuvers requiring extended suspension movements. The normal running of the vehicle is accompanied by small or fine vibrations of the un-sprung mass of the vehicle and thus the need for a soft ride or low damping characteristic of the suspension system to isolate the sprung mass from these vibrations. During a turning or braking maneuver, as an example, the sprung mass of the vehicle will attempt to undergo a relatively slow and/or large vibration which then requires a firm ride or high damping characteristics of the suspension system to support the sprung mass and provide stable handling characteristics to the vehicle. Thus, these multi-force damping force generating devices offer the advantage of a smooth steady state ride by eliminating the high frequency/small excitations from the sprung mass while still providing the necessary damping or firm ride for the suspension system during vehicle maneuvers causing larger excitations of the sprung mass.

The continued development of hydraulic dampers includes the development of multi-force damping force generating devices which are simpler to manufacture, can be manufactured at a lower cost and which improve the desired force generating characteristics.

SUMMARY OF THE INVENTION

The present invention provides the art with a multi-stage hydraulic damper or shock absorber that provides damping which varies according to the stroke amplitude. Soft damping is provided for small strokes and firm damping is provided for large strokes. The variable damping is provided by a sliding sleeve that is frictionally held in place in the pressure cylinder. When the shock absorber undergoes a small stroke, the sliding sleeve remains inactive and the fluid flows through two separate flow paths to provide a soft damping. When the shock absorber undergoes a large stroke, the sliding sleeve moves to progressively close off one of the two flow paths which in turn provides a firm damping. Various design iterations are disclosed for both monotube and double tube shock absorbers.

Other advantages and objects of the present invention will become apparent to those skilled in the art from the subsequent detailed description, appended claims and drawings.

BRIEF DESCRIPTION OF THE DRAWINGS

In the drawings which illustrate the best mode presently contemplated for carrying out the present invention.

DETAILED DESCRIPTION OF THE PREFERRED EMBODIMENT

Figure 1:
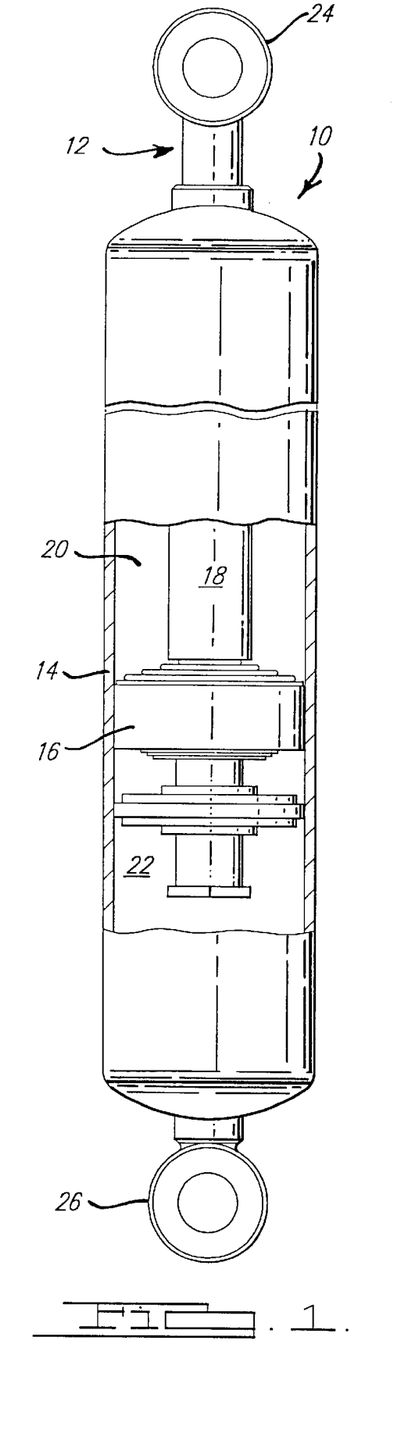
FIG. 1 is cross-sectional side view of a monotube shock absorber incorporating the multi-force damping force generating device in accordance with the present invention.

Referring now to the drawings in which like reference numerals designate like or corresponding parts throughout the several views, there is shown in FIG. 1 a two-stage monotube shock absorber which incorporates the multi-force damping force generating device in accordance with the present invention and which is designated generally by the reference numeral 10. Shock absorber 10 is a monotube design and comprises a piston rod assembly 12 and a pressure tube 14. Piston rod assembly 12 includes a piston valve assembly 16 and a piston rod 18. Valve assembly 16 divides pressure tube 14 into an upper working chamber 20 and a lower working chamber 22. Piston rod 18 extends out of pressure tube 14 and includes a fitting 24 for attachment to one of the sprung or unsprung mass of the vehicle. Pressure tube 14 is filled with fluid and includes a fitting 26 for attachment to the other of the sprung or unsprung masses of the vehicle. Thus, suspension movements of the vehicle will cause extension or compression movement of piston rod assembly 12 with respect to pressure tube 14 and these movements will be dampened due to the restricted fluid flow between chambers 20 and 22 through piston valve assembly 16.

Figure 2:
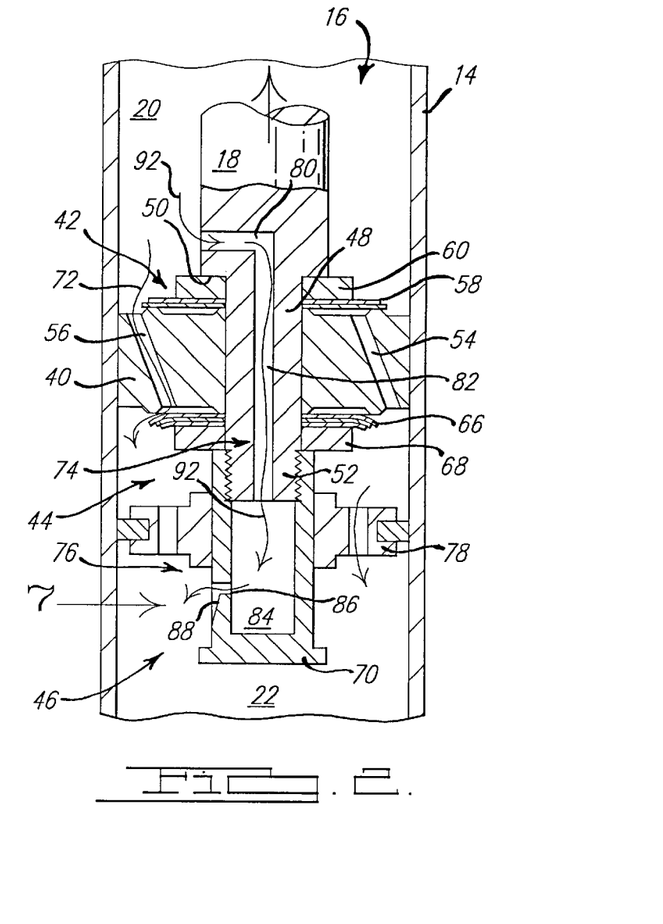
FIG. 2 is an enlarged cross-sectional side view illustrating the piston assembly of the shock absorber shown in FIG. 1 during a small extension stroke of the shock absorber.

Referring now to FIG. 2, piston valve assembly 16 is attached to piston rod 18 and comprises a piston body 40, a compression valve assembly 42, an extension or rebound valve assembly 44 and a sliding valve assembly 46. Piston rod 18 includes a reduced diameter section 48 located on the end of piston rod 18 disposed within pressure tube 14 to form a shoulder 50 for mounting the remaining components of piston valve assembly 16. Piston body 40 is located on reduced diameter section 48 with compression valve assembly 42 being located between piston body 40 and shoulder 50 and with rebound valve assembly 44 being located between piston body 40 and a threaded end 52 of piston rod 18. Piston body 40 defines a plurality of compression flow passages 54 and a plurality of rebound flow passages 56.

Compression valve assembly 42 comprises a plurality of compression valve plates 58 and a compression support plate 60. Valve plates 58 are disposed adjacent to piston body 40 to cover the plurality of compression flow passages 54. Support plate 60 is disposed between valve plates 58 and shoulder 50 to hold valve plates 58 against piston body 40 to close passages 54. During a compression stroke of shock absorber 10, fluid pressure builds up in lower working chamber 22 until the fluid pressure applied to valve plates 58 through passages 54 overcomes the bending load of valve plates 58. Valve plates 58 elastically deflect around the outer edge of support plate 60 to allow fluid to flow from lower working chamber 22 to upper working chamber 20 as shown by arrows 62 in FIGS. 5 and 6.

Rebound valve assembly 44 comprises a plurality of valve plates 66, a rebound support plate 68 and a piston nut 70. Valve plates 66 are disposed adjacent to piston body 40 to cover the plurality of rebound flow passages 56. Support plate 68 is disposed between piston nut 70 and valve plates 66. Piston nut 70 is threaded onto end 52 of piston rod 18 to retain support plate 68 and hold valve plates 66 against piston body 40 to close passages 56. During an extension stroke of shock absorber 10, fluid pressure builds up in upper working chamber 20 until the fluid pressure applied to valve plates 66 through passages 56 overcomes the bending load of valve plates 66. Valve plates 66 elastically deflect around the outer edge of support plate 68 to allow fluid to flow from upper working chamber 20 to lower working chamber 22 as shown by arrows 72 in FIGS. 2–4.

Sliding valve assembly 46 comprises a flow passage 74, a metering slot 76 and a sliding sleeve 78. Flow passage 74 extends through piston rod 18 and includes a radial passage 80 and an axial passage 82 which opens into a chamber 84 defined by piston rod 18 and piston nut 70. Metering slot 76 includes a bore 86 extending radially through piston nut 70 and a tapered slot 88 extending axially along the outer surface of piston nut 70. Sliding sleeve 78 is slidingly received within pressure tube 14 and slidingly received on piston nut 70 to provide the multi-stage damping characteristics for shock absorber 10.

Figures 3, 4:
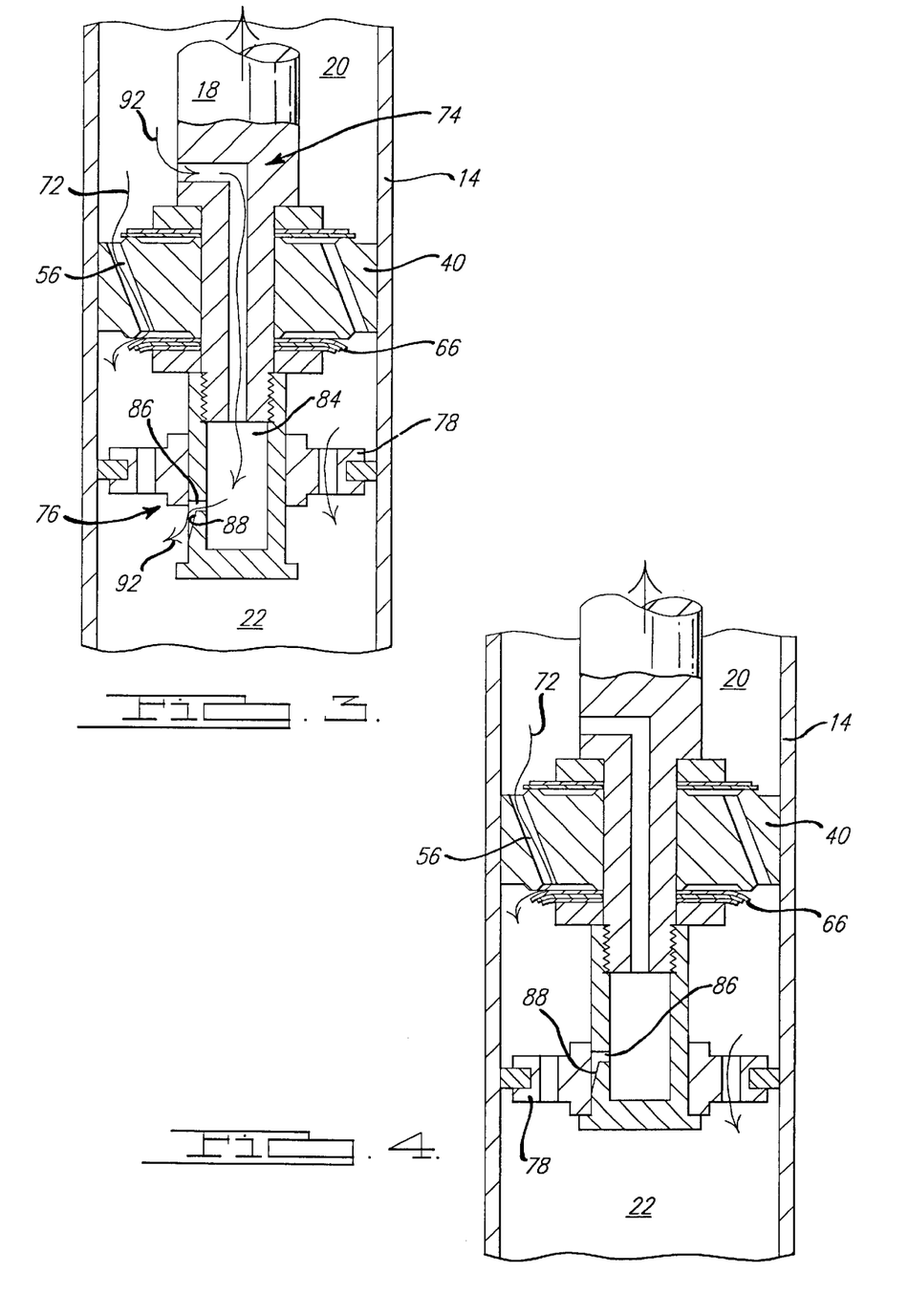
FIG. 3 is an enlarged cross-sectional side view illustrating the piston assembly of the shock absorber shown in FIG. 1 during a larger extension stroke of the shock absorber.
FIG. 4 is an enlarged cross-sectional side view illustrating the piston assembly of the shock absorber shown in FIG. 1 during an even larger extension stroke of the shock absorber.
Figures 5, 6:
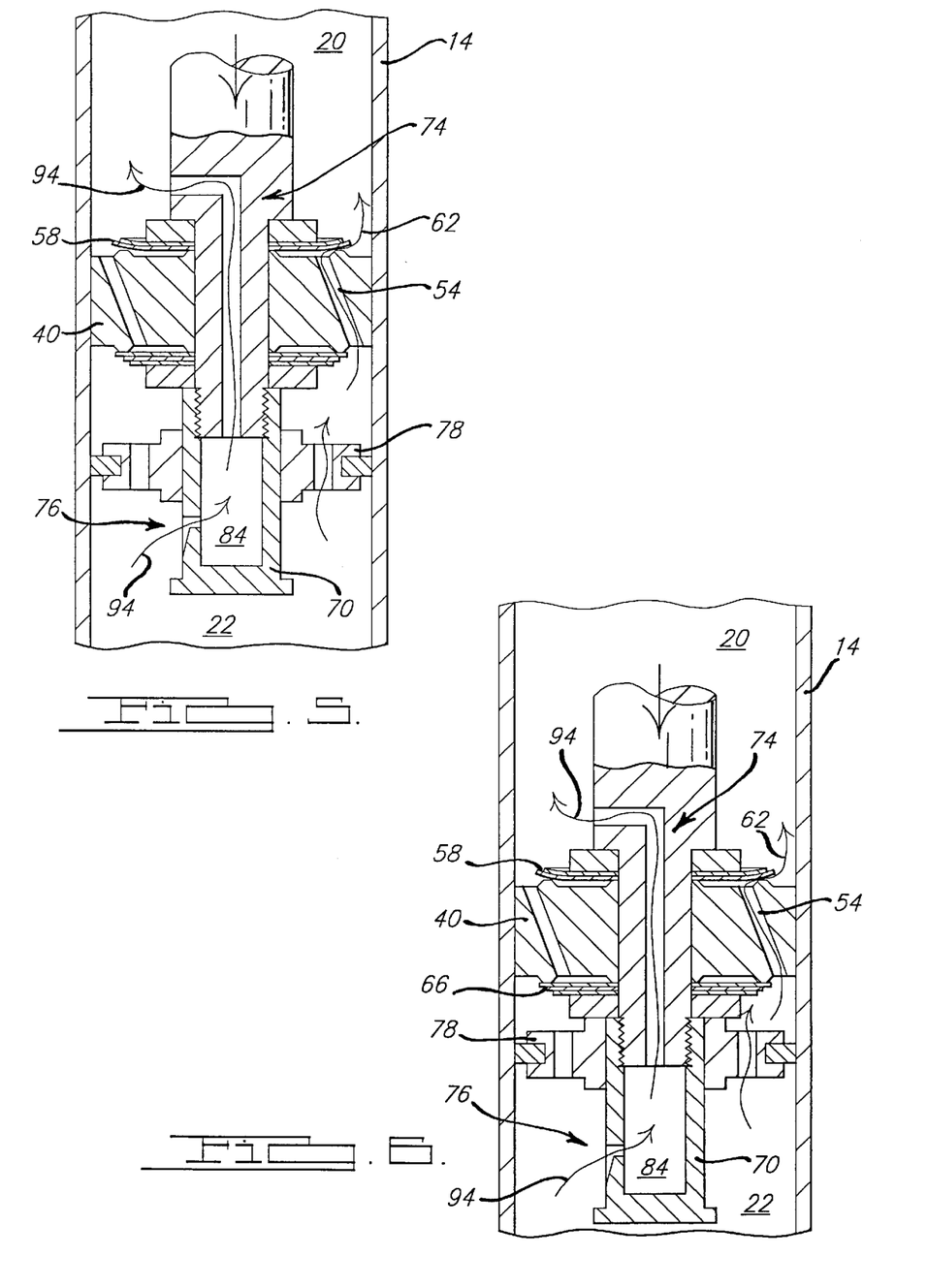
FIG. 5 is an enlarged cross-sectional side view illustrating the piston assembly of the shock absorber shown in FIG. 1 during a small compression stroke of the shock absorber.
FIG. 6 is an enlarged cross-sectional side view illustrating the piston assembly of the shock absorber shown in FIG. 1 during a large compression stroke of the shock absorber.

FIGS. 2 through 6 illustrate the various damping characteristics provided for by piston rod assembly 12 of shock absorber 10. FIG. 2 illustrates a small amplitude extension, FIG. 3 illustrates a larger amplitude extension, FIG. 4 illustrates an even larger amplitude extension, FIG. 5 illustrates a small amplitude compression and FIG. 6 illustrates a large amplitude compression for shock absorber 10.

A small amplitude extension of shock absorber 10 is illustrated in FIG. 2 with arrows 72 and 92 depicting the fluid flow. During small amplitudes of extension, sliding sleeve 78 will only move a small amount with respect to piston nut 70 due to the friction with pressure tube 14 and does not restrict fluid flow through passage 74 and slot 76. Fluid flow from upper chamber 20 of pressure tube 14 into lower chamber 22 of pressure tube 14 occurs through two generally parallel paths. The first path is numbered 72 and extends from upper chamber 20 of pressure tube 14 through passages 56 unseating valve plates 66 from piston body 40 to enter lower chamber 22 of pressure tube 14. Simultaneously, fluid flows through the second flow path as depicted by arrows 92. Fluid flow leaves upper working chamber 20 through passage 74 and enters chamber 84. Fluid flows from chamber 84 through metering slot 76 to also enter lower chamber 22 of pressure tube 14. These dual parallel flow paths 72 and 92, will thus provide a relatively soft ride for small movements of shock absorber 10.

Figure 7:
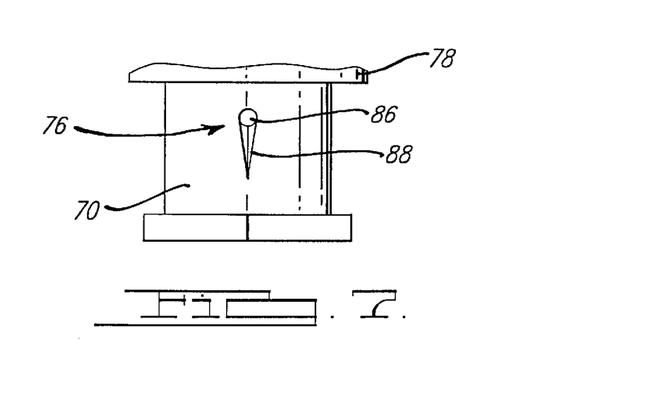
FIG. 7 is an enlarged view of the metering slot shown in FIGS. 1–6.

A larger amplitude extension of shock absorber 10 is illustrated in FIG. 3 with arrows 72 and 92 depicting fluid flow. During the larger amplitudes of extension, sliding sleeve 78 will move enough to cover a portion of bore 86 and possibly a portion of tapered slot 88 due to the friction with pressure tube 14 and will begin progressively closing fluid passage 74. As shown in FIGS. 3 and 7, tapered slot 88 of metering slot 76 permits a gradual or progressive closing of fluid passage 74 which provides the advantage of the major reduction or elimination of the switching noise typical with a dual-stage damping device. Fluid flow from upper chamber 20 of pressure tube 14 into lower chamber 22 of pressure tube 14 still occurs through two generally parallel paths but the second path is progressively being closed off as a function of the amplitude of the stroke. The shape of tapered slot 88 thus provides the shock absorber designer the option of defining the curve between the soft damping characteristics of shock absorber 10 and the firm damping characteristics of shock absorber 10 and no longer requires him to accept a step function. First path 72 extends from upper chamber 20 of pressure tube 14 through passages 56 unseating valve plates 66 from piston body 40 to enter lower chamber 22 of pressure tube 14. Simultaneously, fluid flow through second flow path 92 by leaving upper working chamber 20 through passage 74 and enters chamber 84. Fluid flows from chamber 84 through bore 86 and through tapered slot 88 to also enter chamber 22 of pressure tube 14. The amount of fluid flowing through second flow path 92 will be determined by the position of sliding sleeve 78 with respect to slot 88 and the design of slot 88.

An even larger amplitude extension of shock absorber 10 is illustrated in FIG. 4 with arrows 72 depicting fluid flow. During large amplitudes of extension, sliding sleeve 78 remains in position due to friction and entirely covers bore 86 and slot 88. Fluid flow from upper chamber 20 of pressure tube 14 into lower chamber 22 of pressure tube 14 occurs through only one path which is path 72. As stated above, path 72 extends from upper chamber 20 of pressure tube 14 through passages 56 unseating valve plates 66 from piston body 40 to enter lower chamber 22 of pressure tube 14. Flow path 92, shown in FIGS. 2 and 3, is blocked due to the position of sliding sleeve 78. The single flow path will thus provide a relatively firm ride for larger movements of shock absorber 10.

A small amplitude compression of shock absorber 10 is illustrated in FIG. 5 with arrows 62 and 94 depicting the fluid flow. During small amplitudes of compression, sliding sleeve 78 will move only a small amount with respect to piston nut 70 due to the friction with pressure tube 14. Fluid flow from lower chamber 22 of pressure tube 14 into upper chamber 20 of pressure tube 14 occurs through two generally parallel paths. The first path is numbered 62 and extends from lower chamber 22 of pressure tube 14 through passages 54 unseating valve plate 58 from piston body 40 to enter upper chamber 20 of pressure tube 14. Simultaneously, fluid flows through a second flow path as depicted by arrows 94. Fluid flow leaves lower chamber 22 through metering slot 76 into chamber 84 and through passage 74 to enter upper chamber 20 of pressure tube 14.

A large amplitude compression of shock absorber 10 is illustrated in FIG. 6 with arrows 62 and 94 depicting fluid flow. During large amplitudes of compression, sliding sleeve 78 remains in position due to friction and valve plates 66 contact sliding sleeve 78. Fluid flow from the lower chamber 22 of pressure tube 14 into upper chamber 20 of pressure tube 14 occurs through the same two flow paths described above for small compression movement soft shock absorber 10 as shown in FIG. 5. The multi-force damping characteristics for shock absorber 10 of this embodiment only effect extension movement of shock absorber 10 and not compression movements.

Figures 8, 9:
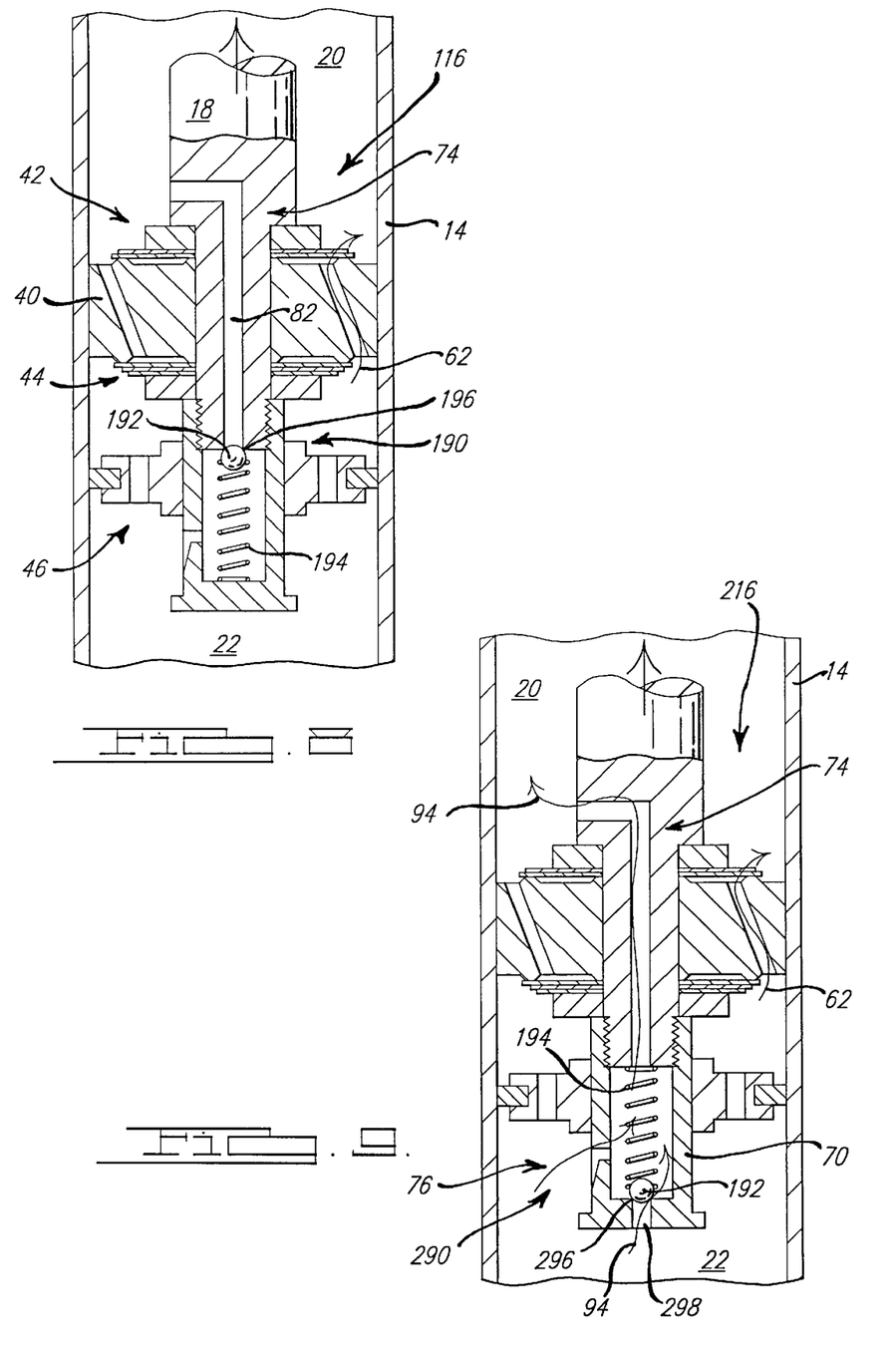
FIG. 8 is an enlarged cross-sectional side view similar to FIG. 2 but illustrating a piston valve assembly in accordance with another embodiment of the present invention.
FIG. 9 is an enlarged cross-sectional side view similar to FIG. 2 but illustrating a piston valve assembly in accordance with another embodiment of the present invention.

Referring now to FIG. 8, a piston valve assembly in accordance with another embodiment of the present invention is illustrated and indicated generally by the reference numeral 116. Piston valve assembly 116 is the same as piston valve assembly 16 except for the incorporation of a check valve assembly 190. Check valve assembly 190 comprises a check ball 192 and a biasing spring 194. Biasing spring 194 urges check ball 192 against a valve seat 196 formed at the lower end of axial passage 82. Check valve assembly 190 functions during a compression stroke to prohibit fluid flow through passage 74. Thus, only the fluid flow depicted by arrows 62 is allowed. Fluid flow depicted by arrows 94 in FIGS. 5 and 6 is prohibited. Thus, the stroke dependency and fluid flow through passage 74 are ineffective during the compression stroke with check valve assembly 190 opening in the extension or rebound stroke.

Referring now to FIG. 9, a piston valve assembly in accordance with another embodiment of the present invention is illustrated and indicated generally by the reference numeral 216. Piston valve assembly 216 is the same as piston valve assembly 16 except for the incorporation of a check valve assembly 290. Check valve assembly 290 comprises check ball 192 and biasing spring 194. Biasing spring 194 urges check ball 192 against a valve seat 296 formed at the upper end of an axial passage 298 extending through the bottom of piston nut 70. Check valve assembly 290 functions during a compression stroke to limit fluid flow through passage 74 to the fluid flow through metering slot 76 until a prespecified fluid pressure is reached in lower working chamber 22. Thus, until the pre-specified pressure is reached, the fluid flow depicted by arrows 62 and 94 is allowed. Fluid flow depicted by arrows 94 is limited to the flow through metering slot 76. Once the pre-specified pressure in lower working chamber 22 is achieved, fluid flows through passage 298 thus increasing the fluid flow through passage 74, thus increasing the fluid flow depicted by arrows 94.

Figure 10:
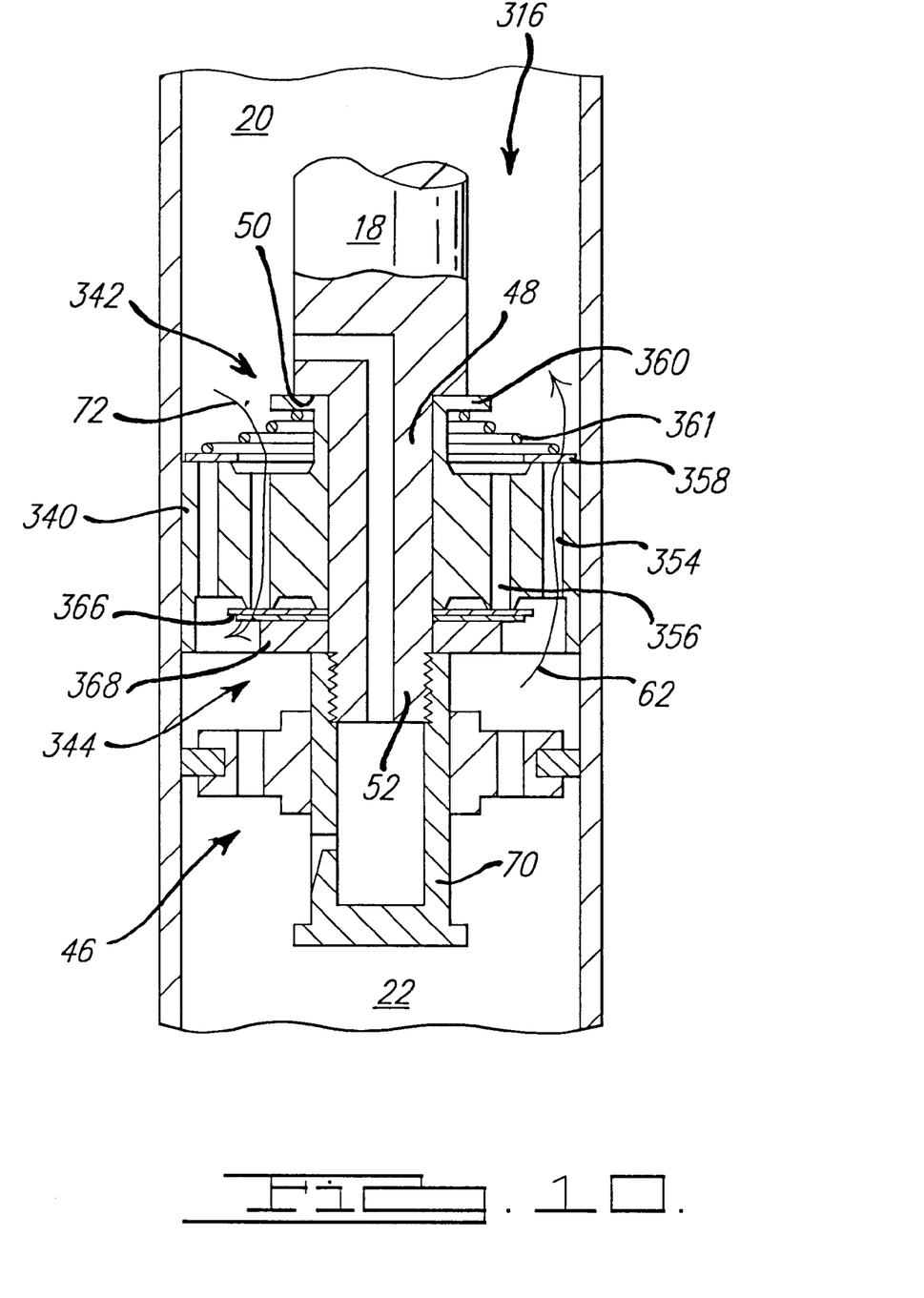
FIG. 10 is an enlarged cross-sectional side view similar to FIG. 2 but illustrating a piston valve assembly in accordance with another embodiment of the present invention.

Referring now to FIG. 10, a piston valve assembly in accordance with another embodiment of the present invention is illustrated and indicated generally by the reference numeral 316. Piston valve assembly 316 is designed for a dual tube shock absorber and is attached to piston rod 18. Piston valve assembly 316 comprises a piston body 340, a compression valve assembly 342, an extension or rebound valve assembly 344 and sliding valve assembly 46. Piston body 340 is located on reduced diameter section 48 with compression valve assembly 342 being located between piston body 340 and shoulder 50 and with rebound assembly 344 being located between piston body 340 and threaded end 52 of piston rod 18. Piston body 340 defines a plurality of compression flow passages 354 and a plurality of rebound flow passages 356.

Compression valve assembly 342 comprises a compression valve plate 358, a compression support plate 360 and a compression valve spring 361. Valve plate 358 is disposed adjacent to piston body 340 to cover the plurality of compression flow passages 354. Support plate 360 is disposed adjacent to shoulder 50 and valve spring 361 is disposed between support plate 360 and valve plate 358 to bias valve plate 358 against piston body 340 to close passages 354. During a compression stroke of the shock absorber, fluid pressure builds up in lower working chamber 22 until the fluid pressure applied to valve plate 358 through passages 354 overcomes the load being exerted by valve spring 361 opening passages 354 to allow fluid to flow from lower working chamber 22 to upper working chamber 20 as shown by arrows 62 in FIG. 10.

Rebound valve assembly 344 comprises a plurality of valve plates 366, a rebound support plate 368 and piston nut 70. Valve plates 366 are disposed adjacent to piston body 340 to cover the plurality of rebound flow passages 356. Support plate 368 is disposed between piston nut 70 and valve plates 366. Piston nut 70 is threaded onto end 52 of piston rod 18 to retain support plate 368 and hold valve plates 366 against piston body 340 to close passages 356. During an extension stroke of the shock absorber, fluid pressure builds up in upper working chamber 20 until the fluid pressure applied to valve plates 366 overcomes the bending load of valve plates 366. Valve plates 366 elastically deflect around the outer edge of support plate 368 to allow fluid to flow from upper working chamber 20 to lower working chamber 22 as shown by arrows 72 in FIG. 10.

The operation and function of sliding valve assembly 46 in conjunction with compression valve assembly 342 and rebound assembly 344 is the same as that described above for valve assemblies 46, 42 and 44. In addition, it is within the scope of the present invention to incorporate check valve assembly 190 shown in FIG. 8 or check valve assembly 290 shown in FIG. 9 into piston valve assembly 316 if desired.

While the above detailed description describes the preferred embodiment of the present invention, it should be understood that the present invention is susceptible to modification, variation and alteration without deviating from the scope and fair meaning of the subjoined claims.

What is claimed is:
1. A two-stage shock absorber comprising:
a pressure tube defining a chamber;
a piston rod disposed within said chamber;
a valve assembly fixably attached to said piston rod and slidably engaging said pressure tube within said chamber, said valve assembly dividing said chamber into an upper and a lower working chamber, said valve assembly providing a first and a second fluid flow path between said upper and lower working chambers completely through said valve assembly, said first and second flow paths of said valve assembly being totally separate from one another; and
a sleeve slidably disposed on said valve assembly, said sleeve being operable to progressively close a third separate and distinct flow path extending between said upper and lower working chambers when movement of said valve assembly exceeds a specified distance, said progressive closing of said third flow path providing a progressively higher resistance to the movement of said valve assembly.

2. The two-stage shock absorber according to claim 1 wherein, said valve assembly comprises a compression valve assembly and a rebound valve assembly.

3. The two stage shock absorber according to claim 1 wherein, said third flow path includes a flow passage extending through said piston rod.

4. The two stage shock absorber according to claim 3 wherein, said third flow path includes a tapered slot disposed between said flow passage and said chamber.

5. The two stage shock absorber according to claim 3 further comprising a check valve assembly disposed within said first flow path.

6. The two stage shock absorber according to claim 1 wherein, said sleeve is frictionally held by said pressure tube.

7. The two stage shock absorber according to claim 1 further comprising a check valve assembly disposed within said first flow path.

8. A two-stage shock absorber comprising:
a pressure tube defining a chamber;
a valve assembly slidably engaging said pressure tube within said chamber, said valve assembly dividing said chamber into an upper and a lower working chamber;
a first flow path extending completely through said valve assembly, said first flow path fluidically connecting said upper and lower working chambers during both extension and compression strokes of said shock absorber;
a second flow path extending completely through said valve assembly, said second flow path fluidically connecting said upper and lower working chambers during both extension and compression strokes of said shock absorber, said second flow path being totally separate from said first flow path;
a piston rod extending through one of said upper and lower working chambers and projecting out of said pressure tube, said piston rod being fixably connected to said valve assembly;
a sleeve slidably disposed on said valve assembly, said sleeve being operable to progressively close a third separate and distinct flow path extending between said upper and lower working chambers when movement of said valve assembly with respect to said pressure tube exceeds a specified distance.

9. The two-stage shock absorber according to claim 8 wherein, said valve assembly comprises a compression valve assembly and a rebound valve assembly.

10. The two stage shock absorber according to claim 8 wherein, said first flow path includes a flow passage extending through said piston rod.

11. The two stage shock absorber according to claim 10 wherein, said first flow path includes a tapered slot disposed between said flow passage and one of said upper and lower working chambers.

12. The two stage shock absorber according to claim 10 further comprising a check valve assembly disposed within said first flow path.

13. The two stage shock absorber according to claim 8 further comprising a check valve assembly disposed within said first flow path.

14. The two stage shock absorber according to claim 8 wherein, said sleeve is frictionally held by said pressure tube.

15. A two-stage shock absorber comprising:
a pressure tube;
a valve system slidably disposed within said pressure tube, said valve system dividing said pressure tube into two liquid chambers, said valve system comprising:
a compression valve assembly providing a first passageway completely through said valve system;
a rebound valve assembly providing a second passageway completely through said valve system, said second passageway being separate from said first passageway;
a piston rod extending through one of said liquid chambers and projecting out of said pressure tube, said piston rod being fixably connected to said valve system and defining a third passageway completely through said valve system, said third passageway being separate from both of said first and second passageways;
a sleeve slidably disposed on said valve system, said sleeve being operable to progressively close said third passageway when movement of said valve system with respect to said pressure tube exceeds a specified distance.

16. The two stage shock absorber according to claim 15 wherein, said third passageway includes a flow passage extending through said piston rod.

17. The two stage shock absorber according to claim 16 wherein, said third passageway includes a tapered slot disposed between said flow passage and one of said upper and lower working chambers.

18. The two stage shock absorber according to claim 16 further comprising a check valve assembly disposed within said third passageway.

19. The two stage shock absorber according to claim 15 further comprising a check valve assembly disposed within said third passageway.

20. The two stage shock absorber according to claim 15 wherein, said sleeve is frictionally held by said pressure tube.

21. A two-stage shock absorber comprising:
a pressure tube;
a piston body slidably disposed within said pressure tube, said piston body dividing said tube into two liquid chambers;
a piston rod extending through one of said liquid chambers and projecting out of said pressure tube, said piston rod being connected to said piston body;
a first and a second valve assembly attached to said piston body, said first and second valve assemblies providing a first and a second passageway, respectively, through said piston body;
a piston nut attached to said piston rod;
a third fluid passageway defined through said piston rod and said piston nut; and
a sleeve slidably disposed on said piston nut, said sleeve being operable to progressively close said third passageway when movement of said piston body with respect to said pressure tube exceeds a specified distance.

22. The two stage shock absorber according to claim 21 wherein, said third passageway includes a tapered slot.

23. The two stage shock absorber according to claim 21 wherein, said sleeve is frictionally held by said pressure tube.

24. The two stage shock absorber according to claim 21 further comprising a check valve assembly disposed within said third passageway.

* * * * *

UNITED STATES PATENT AND TRADEMARK OFFICE
CERTIFICATE OF CORRECTION

PATENT NO. : 6,352,145 B1  
DATED : March 5, 2002  
INVENTOR(S) : Simon Anne DeMolina et al.

It is certified that error appears in the above-identified patent and that said Letters Patent is hereby corrected as shown below:

Column 2,  
Line 11, after "is" insert -- a --

Column 7,  
Line 5, "third" should be -- first --  
Line 8, "third" should be -- first --

Column 8,  
Line 40, "tube" should be -- cylinder --

Signed and Sealed this

Twenty-fourth Day of December, 2002

JAMES E. ROGAN  
*Director of the United States Patent and Trademark Office*